United States Patent [19]

Tokunaga et al.

[11] 4,314,257
[45] Feb. 2, 1982

[54] THERMOMAGNETIC RECORDING APPARATUS

[75] Inventors: Kazuyoshi Tokunaga; Masayasu Anzai; Nobuyoshi Hoshi; Kiyohiko Tanno, Ibaraki, all of Japan

[73] Assignee: Hitachi, Ltd., Tokyo, Japan

[21] Appl. No.: 126,694

[22] Filed: Mar. 3, 1980

[30] Foreign Application Priority Data

Mar. 16, 1979 [JP] Japan .................. 54-29907

[51] Int. Cl.³ .......................................... G11B 11/10
[52] U.S. Cl. .................................. 346/74.4; 360/59; 358/301; 346/74.5; 346/76 AH; 355/3 DR
[58] Field of Search ............... 360/59, 16; 346/74.2, 346/74.4, 74.5, 76 PH, 139 C; 355/3 DR; 358/301

[56] References Cited

U.S. PATENT DOCUMENTS

| 3,043,685 | 7/1962 | Rosenthal | 430/54 |
| 3,512,170 | 5/1970 | Nelson | 346/74.4 |
| 3,601,091 | 8/1971 | Prekshot | 118/636 |
| 3,816,799 | 6/1974 | Ott | 317/2 R |
| 3,832,718 | 8/1974 | Berkowitz | 346/76 L |
| 3,845,306 | 10/1974 | Kohlmannspeger | 360/59 |
| 3,984,844 | 10/1976 | Tanno | 346/139 C |

*Primary Examiner*—Alan Faber
*Attorney, Agent, or Firm*—Craig and Antonelli

[57] ABSTRACT

A thermomagnetic recording apparatus, for example, facsimile receiver wherein the surface of a magnetic drum which is uniformly coated with a magnetic material is uniformly magnetized, the magnetized surface is locally heated to a temperature of at least a Curie point in accordance with facsimile signals by means of a thermal recording head, to reduce the coercise force and to invert the polarity of the magnetization, thereby forming a magnetic latent image, and the magnetic latent image is developed with magnetic toner.

8 Claims, 6 Drawing Figures

THERMOMAGNETIC RECORDING APPARATUS

BACKGROUND OF THE INVENTION

1. Field of the Invention

This invention relates to a thermomagnetic recording apparatus, for example, facsimile receiver. More particularly, it relates to a novel thermomagnetic recording facsimile receiver in which information are recorded on a magnetic drum uniformly magnetized by the use of a thermal recording head, whereby a plurality of received pictures can be obtained at need.

2. Description of the Prior Art

At present, as recording systems in facsimile equipments of the simplified type or the spread type, there are thermosensitive recording, discharge breakdown recording, electrographic recording (of the type wherein an information is directly recorded on electrographic recording paper, and of the type wherein a latent image is once formed on an electrographic recording carrier and then developed, whereupon the developed image is transferred onto ordinary paper), electrophotography (of the type which employs electrophotosensitive paper, and of the type which transfers an image on a electrophotosensitive medium onto ordinary paper and which uses the electrophotosensitive medium repeatedly), etc. In these systems, the special kinds of paper are usually used for the recording, which incurs the disadvantage of high running cost. In the ordinary paper recording systems of the electrographic recording and the electrophotography, the apparent running costs are low owing to the ordinary paper recordings. Since, however, the lifetimes of the electrographic recording medium and the sensitive medium are comparatively short, it is present situation that when the expenses of consumption of the media are apportioned to the respective numbers of recorded pages, the running costs become approximately equal to those in the case of the recordings with the special kinds of paper.

It is well known that the discharge breakdown recording and the thermosensitive recording are inferior in points of the printing quality and the preservability of printed matter.

Although the electrographic recording or the electrophotography has no disadvantage as to the printing quality and the preservability, only one copy can be recorded for one received original. In the electrographic or electrophotographic recording of the transfer type, various systems for taking a plurality of copies from one latent image have been attempted, but there is the disadvantage that the second and further copies are conspicuously inferior in the picture quality to the first copy.

In the electrographic or electrophotographic recording, there is the trend that a one-component type magnetic developer (magnetic toner) of simple constituent is used for the development. In performing the electrographic recording or electrophotographic recording of the transfer type by the use of the magnetic toner, it becomes difficult to select the optimum resistance value of the magnetic toner. More specifically, in case where the resistance value of the magnetic toner is low, the development characteristic becomes good, but the transfer becomes difficult. Conversely, in case of a high-resistance magnetic toner, the transfer characteristic is improved, but the development density becomes low. It turns out that the optimum resistance region of the magnetic toner is not existent or is limited to a very narrow range, and there is the disadvantage that a stable operating characteristic cannot be attained.

As a recording system which has solved the various disadvantages mentioned above, there has been developed a magnetic recording system wherein a latent image is formed on a magnetic drum by the use of a magnetic head, it is developed with magnetic toner and the developed image is thereafter transferred onto ordinary paper. This system is freed from the narrow selectivity of the magnetic toner which has been the problem in the prior-art electrographic or electrophotographic recording system of the transfer type. That is, since the development is performed by sticking the magnetic toner by a magnetic attractive force, only the transfer characteristic may be noted as the electrical characteristic of the developer. Accordingly, the range of selection for the magnetic toner widens.

A disadvantage of the magnetic recording system is that the recording rate needs to be changed between the operation of forming the magnetic latent image and the subsequent operation of the development and the transfer. More specifically, the recording medium is usually constructed in the shape of a drum. It is extremely difficult and impossible in practice to construct the magnetic head in an elongate array shape. Therefore, a scanning system is adopted in which the rotary drum is scanned with a single head or a multi-head assembly including at most several heads. For this reason, the rotation of the magnetic drum in the operation of forming the magnetic latent image is set at a high rotational frequency, and once the magnetic latent image has been entirely formed on the drum, the number of revolutions of the drum is lowered, whereupon the respective stages of development, transfer, and fixation of the transfer are executed.

With such recording system, the rotation of the drum needs to be changed-over between the two sorts, and the running situation of the equipment during the formation of the latent image and that of the equipment during the development and transfer are conspicuously different, so that the equipment becomes complicated. This forms a hindrance to redering the size of the equipment small and the cost low.

As recording apparatuses wherein a magnetic latent image according to information is formed on a magnetic recording medium and wherein the magnetic latent image is developed with toner so as to obtain a visible image, there can be mentioned ones disclosed in U.S. Pat. No. 3,043,685 (Joseph F. Rosenthal), U.S. Pat. No. 3,512,170 (Alfred M. Nelson), U.S. Pat. No. 3,601,091 (George G. Preckshot), U.S. Pat. No. 3,816,799 (Owen J. Ott et al) and U.S. Pat. No. 3,832,718 (Ami E. Berkowitz et al).

SUMMARY OF THE INVENTION

Object

It is accordingly an object of this invention to provide a facsimile equipment which has eliminated the disadvantages of the prior arts described above and which has features as listed below:

(1) The running cost is low.
(2) A large number of copies can be easily produced.
(3) The preservability of printed matter is good.
(4) A recording device is simple, small-sized and inexpensive.
(5) An image forming material (toner) is easily selected.

BRIEF SUMMARY

This invention consists in a thermomagnetic recording facsimile receiver having a magnetic recording medium which is uniformly coated with a magnetic material, magnetizing means to magnetize the magnetic material in a fixed direction, a heating recording head which is placed in adjacency to the magnetic recording medium, means to subject the magnetic recording medium to development so as to obtain a developed image, means to transfer the developed image from the recording medium onto a transfer medium, means to fix the transferred image onto the transfer medium, and means to sweep away developer powder remaining on the recording medium after the transfer; characterized in that said heating recording head comprises a large number of heating recording elements which are arrayed over substantially a full width of said magnetic material, and that said heating recording elements are selectively caused to generate heat so that picture element areas of said magnetic recording medium opposing to the elements can be heated near to a Curie point of said magnetic material.

DETAILED DESCRIPTION OF THE PREFERRED EMBODIMENTS

Hereunder, this invention will be described in detail with reference to the drawings.

Figure 1:
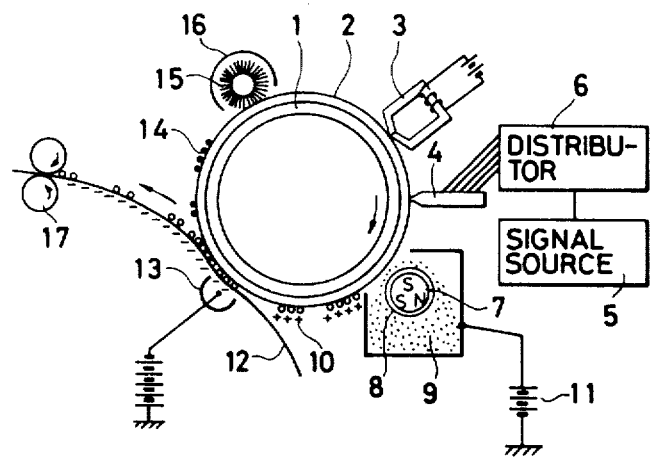
FIG. 1 is a schematic view of the general construction of a thermomagnetic recording facsimile receiver showing an embodiment of this invention.

In FIG. 1, numeral 1 designates a base which is made of a nonmagnetic material such as aluminum and the surface of which is uniformly coated with a magnetic member 2, to construct a magnetic recording medium. As the material of the magnetic member 2, there is employed MnBi, EuO, $CrO_2$, Co-P, CrTe or the like having a Curie point of comparatively low temperature. Numeral 3 designates a d.c. magnetizer, which has the function of magnetizing the magnetic member 2 in a fixed direction previously to recording. Numeral 4 indicates a thermal recording head. As will be stated later concretely, the thermal recording head 4 has a structure as disclosed in the specification and drawings of U.S. Pat. No. 3,984,844 (Tanno et al). In a preferred aspect of performance, the thermal recording head 4 is provided with an array of thermal recording elements of thick film or thin film which can cover the whole axial length of the drum or the recording medium. Shown at 5 is a signal source, which supplies a received facsimile signal. A distributor 6 functions to distribute and supply the received facsimile signals to the thermal recording element array. A magnetic latent image is formed on the magnetic member 2 by means of the thermal recording elements.

Figure 2:
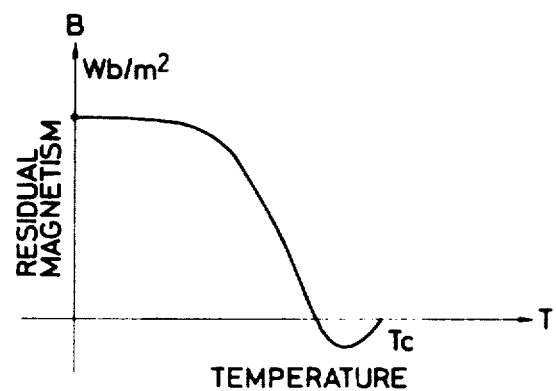
FIG. 2 is a graph of a temperature characteristic curve of a magnetic recording medium for explaining the recording principle of thermomagnetic recording.

FIG. 2 illustrates the appearance in which the magnetic latent image is formed on the magnetic member by the thermal recording head 4. The axis of ordinates represents the residual magnetism, and how it varies depending upon the temperature taken on the axis of abscissas is seen. When heated near to the Curie point $T_c$, the magnetic member 2 magnetized in the fixed direction in advance has its coercive force reduced and has the polarity of its magnetization inverted by a diamagnetic field of the surrounding magnetization.

In the equipment of FIG. 1, picture element areas of the magnetic member 2 are selectively heated in correspondence with the received facsimile signals by means of the thermal recording elements of the thermal recording head 4. As apparent from the above description, radical changes in the magnetic flux density occur in the heated parts.

The magnetic member 2 thus formed with the magnetic latent image can be developed by rubbing the latent image with magnetic toner 9 which includes a magnetic substance as its constituent. The magnetic toner 9 forms a magnetic brush on a rotary sleeve 8 surrounding a permanent magnet 7. Magnetic toner layers 10 can be formed on those portions of the magnetic material 2 in which the flux density has changed.

At this time, when the entire developing machine is biased with respect to the magnetic member 2, a good effect is attained in a transferring operation to be described later. Shown at 11 is a bias voltage source for biasing the developing machine on the plus side. Owing to this effect, the magnetic toner layers 10 formed on the magnetic material 2 are charged in the plus polarity.

Numeral 12 indicates a transfer medium such as ordinary paper. The transfer medium 12 is fed in contact with the magnetic member 2. In the contact portion, the rear surface of the transfer medium is subjected to the corona charging by means of at least a corona charging electrode 13. This corona charging carries out charging in the opposite polarity to the charging polarity of the magnetic toner layer 10, so that the magnetic toner layer 10 is mostly transferred onto the transfer medium 12.

Since the magnetic toner layer is not completely transferred, remaining toner 14 exists on the magnetic member 2 after the transfer. In executing the next recording, the remaining toner 14 is swept away in such a way that a fur brush 15 disposed within a housing 16 is rotated at high speed.

On the other hand, the transfer medium 12 is passed between pressure rollers 17, whereby the magnetic toner can be fixed, this being a well-known fact.

In the above description, one sheet of recorded matter is obtained with respect to one reception. It occasionally occurs, however, that a plurality of sheets of printed matter are necessary with respect to one reception. At this time, in compliance with the request for making the plurality of copies, the following measures are taken after the magnetic latent image has been formed:

(1) The energization of the d.c. magnetizer is stopped. That is, the d.c. magnetizer is deenergized or is separated from the magnetic material 2.

(2) The energization of the thermal recording elements is stopped. That is, the thermal recording elements have the supply of the recording signals stopped or are separated from the magnetic material. When the recording device is continuously operated after taking such measures, the magnetic latent image on the magnetic member 2 does not disappear, and hence, the required number of copies of recorded matter can be obtained by repeatedly developing the latent image with the developing machine and transferring and fixing the developed image on the transfer medium.

In the description of the embodiment of FIG. 1, an electromagnet is exemplified as the d.c. magnetizer 3. As already apparent from the above explanation, the function of the magnetizer is to magnetize the magnetic member in the fixed direction in advance. It is therefore to be understood that the electromagnet may well be replaced with a permanent magnet.

When, in case of employing the permanent magnet instead of the electromagnet, it is intended to print a large number of copies in correspondence with one reception, the d.c. magnetizer made up of the permanent magnet may be separated from the magnetic member 2 so as to become incapable of magnetizing the magnetic member 2.

Figure 3:
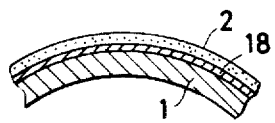
FIG. 3 is a partial sectional view showing another embodiment of the magnetic recording medium.

By way of example, FIG. 3 shows an improved embodiment of the magnetic member 2. In the embodiment of FIG. 3, an intermediate layer 18 made of a glass member which has a very high thermal resistance and which is not electrostatically charged is interposed between the base 1 and the magnetic member 2. The electric resistivity of this intermediate layer should preferably be $10^{13}$ $\Omega$-cm or less.

Since the intermediate layer 18 is a thermal insulator, it can effectively prevent the heat generated by the heating recording head 4 in FIG. 1, from passing through the magnetic material layer 2 and escaping into the base 1. Thus, the magnetic substance can be brought to the Curie point or above with a small amount of heat generation. On the other hand, regarding a restriction in the electric resistance, the corona charging device is used for transferring the magnetic toner layer 10 onto the transfer medium 12, and the intermediate layer 18 is intended to prevent the magnetic member 2 from unnecessarily having a surface potential in that case. The intermediate layer 18 holds substantially no static charge when its resistivity is $10^{13}$ $\Omega$-cm or less.

It is desirable that the same requirement is fulfilled for the resistivity of the magnetic member 2. The reason is the same as stated above.

Figure 4:
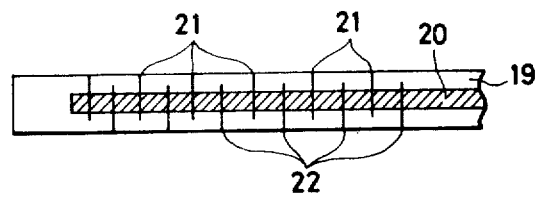
FIG. 4 is a partial plan view showing an embodiment of a heating recording head for use in the performance of this invention.

FIG. 4 shows a concrete embodiment of the thermal recording head 4. In FIG. 4, numeral 19 designates a recording head substrate, which has a single rectilinear heating resistor 20. The heating resistor 20 is substantially divided into the picture elements to be recorded on the magnetic member 2, by means of drive leads 21 and 22 which are alternately drawn out onto the opposite sides. Accordingly, when current is conducted between selected ones of the drive leads 21 and 22, the resistance regions between the leads generate heat, so that a desired magnetic latent image can be formed. Such head is easy of fabrication, and can make a recorded picture which does not undergo any "joint" (or vacancy) among the picture elements.

Figure 5:
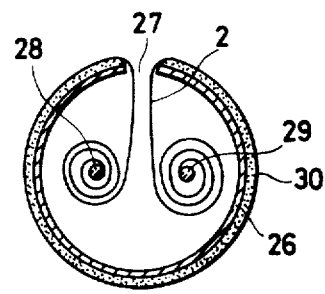
FIG. 5 is a sectional view showing still another embodiment of the magnetic recording medium.
Figure 6:
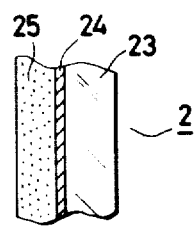
FIG. 6 is an enlarged sectional view of the magnetic recording medium shown in FIG. 5.

FIGS. 5 and 6 show another aspect of performance of the magnetic member 2. This magnetic member is in the shape of sheet.

Numeral 23 indicates a flexible film such as polyester film, on which an electrically conductive layer 24 is disposed by a known expedient. For the same reason as in the case of the intermediate layer 18, the resistivity of the conductive layer should preferably be $10^{13}$ $\Omega$-cm or less. The conductive layer 24 is overlaid with a coating layer of magnetic substance 25. The magnetic recording medium thus constructed is received in a drum body 26 which is provided with a slit 27. Inside the drum body 26, there are a feed reel 28 and a take-up reel 29 for the magnetic recording medium. The recording medium delivered from the feed reel 28 passes through the slit 27 and forms the outer peripheral portion of the drum body. Thereafter, it passes through the slit 27 again, enters the interior of the drum body and is taken up by the take-up reel 29. With the recording medium thus constructed, that part of the magnetic-substance coating layer which has become unsuitable for use due to a damage or stain of the surface can be taken up on the take-up reel so as to use a new part of the magnetic-substance coating layer. The recording medium can be exchanged very simply and inexpensively, and the maintenance is facilitated.

In the recording medium as illustrated in FIGS. 5 and 6, a buffer layer 30 which has an elasticity against a depressing force can be interposed between the flexible film 23 and the drum body 26. The buffer layer 30 is, for example, a thin layer of sponge. It has the double effect of protecting the thermal recording elements and making the contact between the thermal recording elements and the magnetic member uniform.

The magnetic image on the magnetic member recorded by this invention can, not only be visualized with the toner, but also be derived as electric signals by scanning it with a magnetic reproducing head. It is also possible to form the magnetic image by the use of thermal means and magnetic means.

Since this invention is constructed and operated as described above, it permits the recording on ordinary paper, can render the running cost very low and improves the preservability of recorded matter. In addition, since the recording medium can be operated at an identical speed both in the preparation of the latent image and in the developing and subsequent operations, the miniaturization of the equipment can be achieved. Furthermore, a plurality of copies can be readily made from one received original by the simple operations. This invention has such very excellent effects in industry.

We claim:

1. In a thermomagnetic recording apparatus having a magnetic recording medium which is uniformly coated with a magnetic material, magnetizing means to magnetize the magnetic material, a thermal recording head which is placed in adjacency to the magnetic recording medium, means to subject the magnetic recording medium to development so as to obtain a developed image, means to transfer the developed image from the recording medium onto a transfer medium, means to fix the transferred image onto the transfer medium, and means to sweep away developer powder remaining on the recording medium after the development as well as the transfer; a thermomagnetic recording facsimile receiver characterized in that said thermal recording head comprises a large number of heating recording elements which are arrayed over substantially a full width of a recording region of said magnetic material, and that selected ones of said heating recording elements are energized to generate heat, whereby picture element areas of said magnetic material opposing to the selected elements can be heated near to a Curie point of said magnetic material.

2. A thermomagnetic recording apparatus as defined in claim 1, characterized in that a d.c. magnetizer forming said magnetizing means, and said thermal recording head can be deenergized at need, whereby the magnetic toner-developing and transferring step can be executed a plurality of times with respect to one time of formation of the magnetic latent image.

3. A thermomagnetic recording apparatus as defined in claim 1, characterized in that said magnetic recording medium uniformly coated with said magnetic material consists of a base which is an electrically-conductive and nonmagnetic material, and a layer of said magnetic material which is uniformly applied on said base, and that an intermediate glass layer which is thermally an insulator and whose electric resistivity is at most $10^{13}$ $\Omega\cdot$cm is interposed between said base and said magnetic material.

4. A thermomagnetic recording apparatus as defined in claim 1, characterized in that means to subject the magnetic recording medium to development so as to obtain a developed image is biased in a polarity opposite to that of a corona discharge voltage for the transfer, relative to said magnetic recording medium.

5. A thermomagnetic recording apparatus as defined in claim 1, characterized in that said heating recording elements are constructed of a rectilinear heating resistor which is partitioned by lead electrodes.

6. A thermomagnetic recording apparatus as defined in claim 1, characterized in that said magnetic recording medium is a roll which is constructed of a flexible film and said magnetic material applied thereon, and that said recording medium is delivered from a reel received inside a hollow drum, comes out of a slit provided in a part of said hollow drum and is wound on substantially a whole outer periphery of said hollow drum, and passes through said slit again and is taken up by another reel.

7. A thermomagnetic recording apparatus as defined in claim 6, characterized in that said magnetic recording medium is provided with an electrically-conductive layer having an electric resistivity of at most $10^{13}$ $\Omega\cdot$cm, between said flexible film and said magnetic material applied thereon.

8. A thermomagnetic recording apparatus as defined in claim 6, characterized in that a buffer layer which has an elasticity against a depressing force is interposed between said hollow drum and said magnetic recording medium.

* * * * *